(12) United States Patent
Fischer et al.

(10) Patent No.: US 6,311,220 B1
(45) Date of Patent: *Oct. 30, 2001

(54) METHOD AND APPARATUS FOR COMMUNICATING DATA AND MANAGEMENT INFORMATION

(75) Inventors: Keith S. Fischer, Sunnyvale; Corey A. Selby, Hollister; Robert W. Smith, Los Altos, all of CA (US); Kevin G. Smith, Austin, TX (US)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,605

(22) Filed: Dec. 29, 1999

Related U.S. Application Data

(63) Continuation of application No. 08/869,440, filed on Jun. 4, 1997, now Pat. No. 6,014,704.

(51) Int. Cl.[7] ..................................................... G06F 15/16
(52) U.S. Cl. ........................................... 709/230; 709/250
(58) Field of Search ..................................... 709/250, 249, 709/237, 230, 200

(56) References Cited

U.S. PATENT DOCUMENTS

| | | | |
|---|---|---|---|
| 5,535,211 | * | 7/1996 | Yano .................. 370/85.2 |
| 5,550,802 | | 8/1996 | Worsley et al. ......... 370/13 |
| 5,557,633 | * | 9/1996 | Staab et al. ........... 375/213 |
| 5,604,741 | | 2/1997 | Samueli et al. ......... 370/402 |
| 5,727,170 | | 3/1998 | Mitchell et al. ......... 710/105 |
| 5,754,552 | | 5/1998 | Allmond et al. ........ 370/465 |
| 5,841,990 | | 11/1998 | Picazo, Jr. et al. ..... 709/249 |
| 5,889,776 | * | 3/1999 | Liang .................. 370/389 |

* cited by examiner

Primary Examiner—Mehmet B. Geckil
(74) Attorney, Agent, or Firm—Blakely Sokoloff Taylor & Zafman LLP

(57) ABSTRACT

A system is provided for communicating data between a first device and a second device across a communication link. Data is communicated between the first device and the second device across the communication link using a first protocol. Management information is communicated between the first device and the second device across the communication link using a second protocol. The system is capable of determining whether the first device is capable of communicating management information with the second device. If the first device is capable of communicating management information with the second device, then the system enables the communication of management information between the first device and the second device.

23 Claims, 4 Drawing Sheets

METHOD AND APPARATUS FOR COMMUNICATING DATA AND MANAGEMENT INFORMATION

CROSS-REFERENCES TO RELATED APPLICATIONS

This is a continuation of a U.S. patent application (application Ser. No. 08/869,440) filed Jun. 4, 1997 now U.S. Pat. No. 6,014,704.

FIELD OF THE INVENTION

The present invention relates to systems for communicating data between two or more devices. More specifically, the invention provides a system for communicating data across a communication link using a first protocol and transmitting management information across the communication link using a second protocol.

BACKGROUND

Various types of communication devices are available for communicating, managing, and handling data in a communication system such as a network. These communication devices include data terminal equipment (DTE), hubs, repeaters, network management units, and other devices capable of being coupled to another communication device or coupled to a network. Communication devices typically include one or more ports for transmitting and receiving data. These ports may be coupled to ports on other communication devices or coupled to a network.

In a network environment, multiple communication devices can be coupled together to permit the communication of data throughout the network. For example, a particular network may include several network hubs coupled to one another. In this example, each hub is capable of communicating with other hubs as well as communicating with and controlling communication devices coupled to the hub.

In known communication devices, a particular port may be designated as either a master port or a slave port (also referred to as a managed port or a controlled port). Network hubs typically have multiple ports for coupling to multiple communication devices. certain situations, a network hub may be used as a control device for multiple communication devices. At the same time, the hub may receive control signals from another network device, such as a master device. To provide for this situation, known network hubs include multiple ports, one or more of which are dedicated to coupling a control device. Other ports in the network hub are dedicated to coupling communication devices that are controlled by the hub. Since all ports in the network hub have a dedicated configuration, a hub that is used only to control other communication devices cannot utilize the ports dedicated to coupling to a control device. Therefore, the hub resources are not fully utilized because the controlled port cannot be used to couple network devices.

Additionally, known systems use separate communication links for transmitting data and transmitting management or control signals. Thus, a first port is provided for communicating data with another communication device, and a second port is provided for communicating management or control information with the other communication device. This configuration requires two separate communication links and a pair of ports on each communication device. The additional communication links and ports increase the overall cost and complexity of the communication devices and require additional physical space on the device to attach the additional ports.

It is therefore desirable to provide a communication system that is capable of transmitting both data and management information across a single communication link using a single communication port on each communication device.

SUMMARY OF THE INVENTION

Embodiments of the present invention provide a communication system that is capable of transmitting both data and management information across a single communication link using a single communication port on each communication device. The communication port determines the type of port at the opposite end of the communication link and configures its operation accordingly. Two different protocols can be used to communicate the data and the management information across the communication device.

A particular embodiment of the invention communicates data between a first device and a second device across a communication link using a first protocol. Management information is communicated between the first device and the second device across the communication link using a second protocol.

In other embodiments of the invention, a communication port is determines whether the first device is capable of communicating management information with the second device. If the first device is capable of communicating management information with the second device, then the communication port is enabled to communicate management information between the first device and the second device using the second protocol.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, and circuits have not been described in detail so as not to obscure the invention.

Embodiments of the present invention provide a communication system that is capable of transmitting both data and management information across a single communication link using a single communication port on each communication device. The communication port automatically senses the type of port at the opposite end of the communication link and configures its operation accordingly. The communication port is configured to communicate only data if the port on the opposite end of the communication link is incapable of communicating management information. Additionally, the communication port is configured to communicate data as well as management information if the port on the opposite end of the communication link is capable of communicating management information. In this configuration, one protocol can be used to communicate the data and another protocol can be used to communicate the management information. In certain situations, there may be economic or technical advantages in using existing hardware and software associated with one protocol (e.g., Ethernet) to manage the flow of data, which uses a different protocol (e.g., Token Ring).

Figure 1:
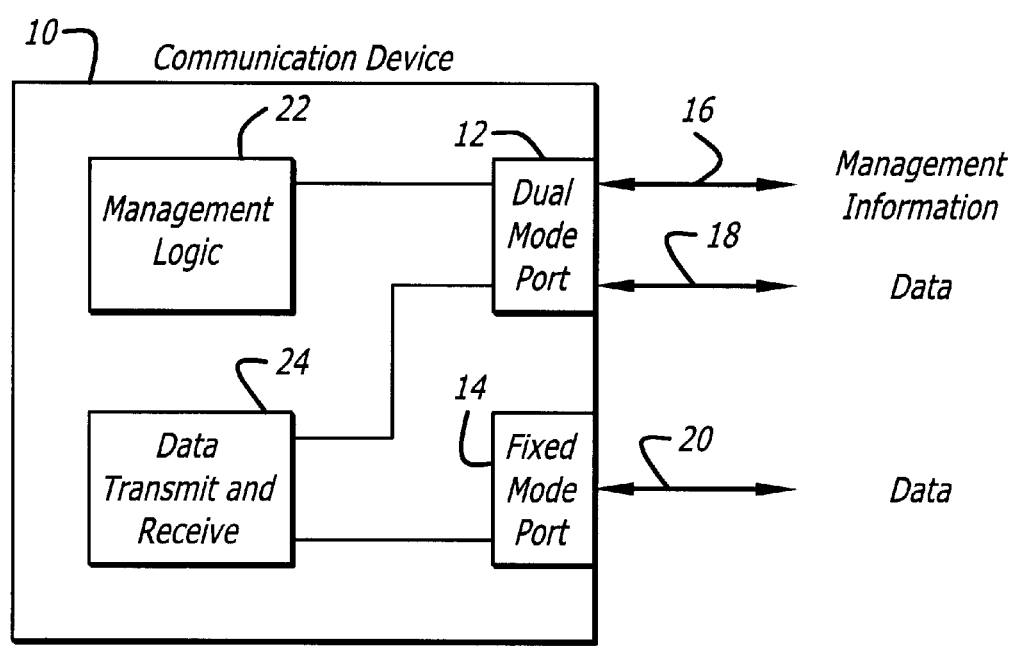
FIG. 1 illustrates an embodiment of a communication device having a dual-mode port and a fixed-mode port.

FIG. 1 illustrates an embodiment of a communication device 10 having a dual-mode port 12 and a fixed-mode port 14. Although communication device 10 is shown with two ports, it will be appreciated that communication device 10 may include any number of dual-mode ports 12 and any number of fixed-mode ports 14. A particular embodiment of communication device 10 includes six dual-mode ports 12 and eighteen fixed-mode ports 14, for a total of twenty-four ports. Other embodiments of the invention may include one or more dual-mode ports 12, but not include any fixed-mode ports.

Fixed-mode port 14 has a single mode of operation. This single mode of operation may include communicating data using a particular protocol, such as Ethernet, Token Ring, or any other data communication protocol. In a particular embodiment of the invention, fixed-mode port 14 is a data communication port using the Token Ring protocol. Fixed-mode port 14 communicates data and other information using a communication link 20.

Dual-mode port 12 has multiple modes of operation. For example, in a first mode of operation, dual-mode port 12 is a data communication port using the Token Ring protocol. In this first mode of operation, port 12 operates as a conventional Token Ring port. In a second mode of operation, dual-mode port 12 communicates data using the Token Ring protocol and also communicates management information using another protocol, such as Ethernet. As shown in FIG. 1, in this dual mode of operation, port 12 communicates data using a communication link 18 and communicates management information using a communication link 16. The management information communicated across link 16 is generated by management logic 22, which is coupled to dual-mode port 12. This management information may include commands and other information necessary to control or monitor the operation of other communication devices coupled to communication device 10. In an embodiment of the invention, the management information includes statistics collected (e.g., number of packets) and the commands include enabling or disabling other ports in the communication device.

Although communication links 16 and 18 are illustrated in FIG. 1 as two separate communication links, they may be incorporated into a single cable or other transmission medium. For example, communication link 16 may use a pair of conductors in a twisted-pair cable, and communication link 18 may use another pair of conductors in the same twisted-pair cable. Thus, instead of using separate cables (and separate ports) to transmit data and management information, the embodiment of FIG. 1 permits a single cable (and a single port) to transmit both data and management information. Additionally, different protocols may be used with each pair of conductors (e.g., the Token Ring protocol can be used to transmit data, and the 10 Base T Ethernet protocol can be used to transmit management information). Since the management information is transmitted on a separate pair of conductors, the information does not interfere with or affect the bandwidth of the data being transmitted on the other conductors, if properly designed. In a particular embodiment of the invention, communication links 16 and 18 are contained in a single cable having multiple twisted pairs of conductors (e.g., category 5 cable).

A data transmit and receive module 24 is coupled to both dual-mode port 12 and fixed-mode port 14. Module 24 handles the incoming and outgoing data communicated across communication links 18 and 20 by ports 12 and 14, respectively.

Although not shown in FIG. 1, communication device 10 may also include additional components or modules, such as a Central Processing Unit (CPU), memory devices, mass storage devices, additional ports, and other modules.

Figure 2:
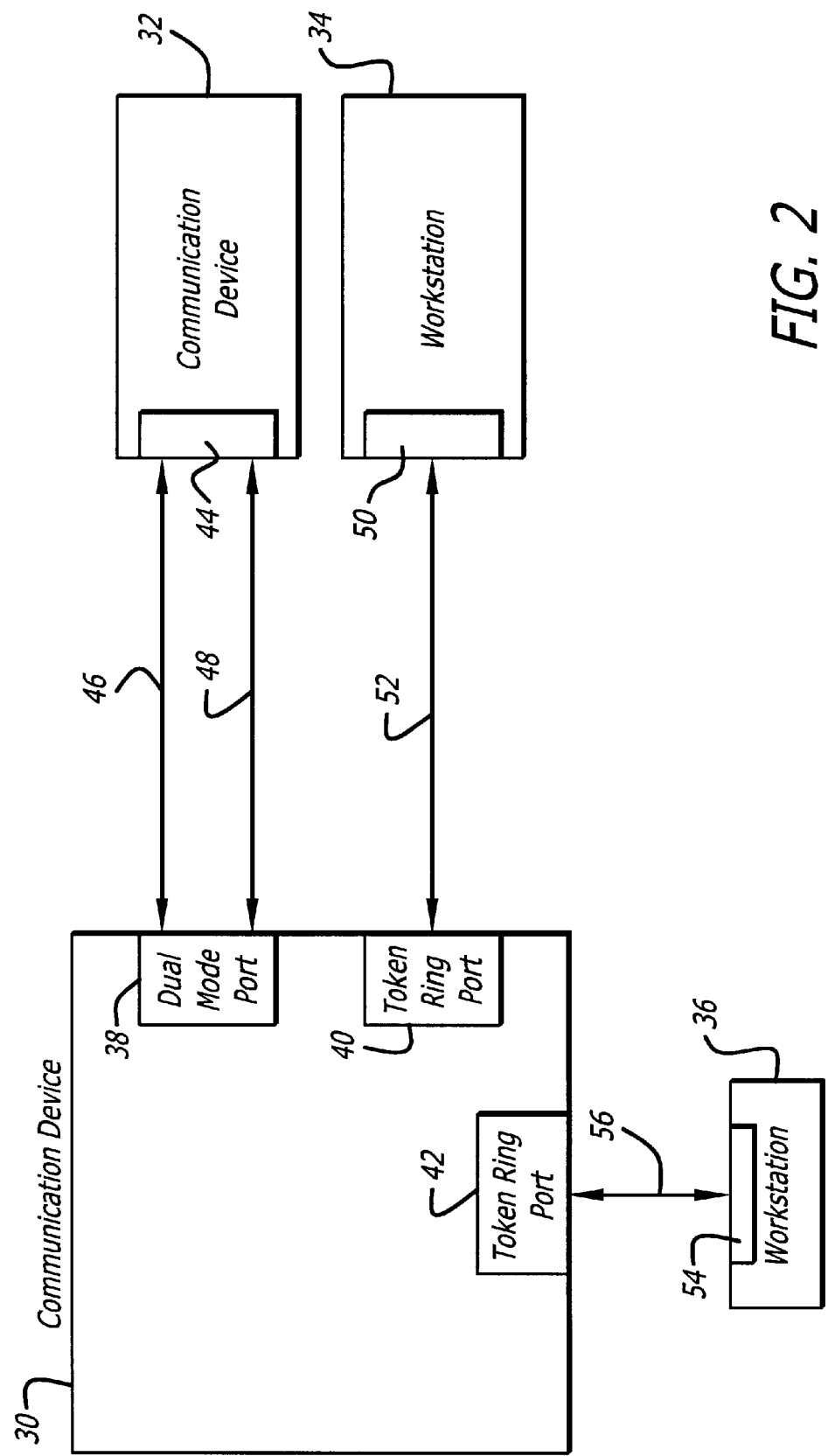
FIG. 2 illustrates an example arrangement of multiple devices coupled to a communication device.

FIG. 2 illustrates an example arrangement of multiple devices coupled to a communication device 30. Various modules and components of communication device 30 have been omitted for purposes of clarity. Communication device 30 is coupled to multiple devices 32, 34, and 36. Communication device 30 includes a dual-mode port 38 and a pair of fixed-mode Token Ring ports 40 and 42. Dual-mode port 38 is capable of operating as a fixed-mode Token Ring port for communicating Token Ring data, or operating as a dual-mode port for communicating Token Ring data as well as management information, as discussed above. In the embodiment of FIG. 2, dual-mode port 38 is configured to transmit Token Ring data across a communication link 46 and is configured to transmit management information across a communication link 48 using the Ethernet protocol. As discussed above with respect to FIG. 1, communication links 46 and 48 may be contained within a single cable, such as a twisted-pair cable. Although a particular example is described as using the Token Ring protocol to transmit data and the Ethernet protocol to transmit management information, those of ordinary skill in the art will appreciate that other protocols may be used to transmit data or management information.

Communication device 32 includes a dual-mode port 44 that is capable of communicating data (such as Token Ring data) using communication link 46 and capable of communicating management information (e.g., using the Ethernet protocol) on communication link 48. Communication device 32 may be a hub (e.g., a Token Ring hub) or any other device capable of communicating with communication device 30. Although not shown in FIG. 2, other devices (such as a workstation) may be coupled to communication device 32.

Workstation 34 includes a fixed-mode Token Ring port 50 coupled to communication link 52. Thus, workstation 34 is capable of communicating Token Ring data with communication device 30. However, since workstation 34 contains a fixed-mode port, communication link 52 does not support the communication of management information between communication device 30 and workstation 34. Workstation 34 may be any type of workstation using any type of processor. Similarly, workstation 36 includes a fixed-mode Token Ring port 54 coupled to communication link 56. As with workstation 34 discussed above, workstation 36 is capable of communicating Token Ring data with communication device 30, but does not support the communication of management information with device 30. Workstations 34 and 36 may be any type of station coupled to a Token Ring network, such as a server or a network printer.

Figure 3:
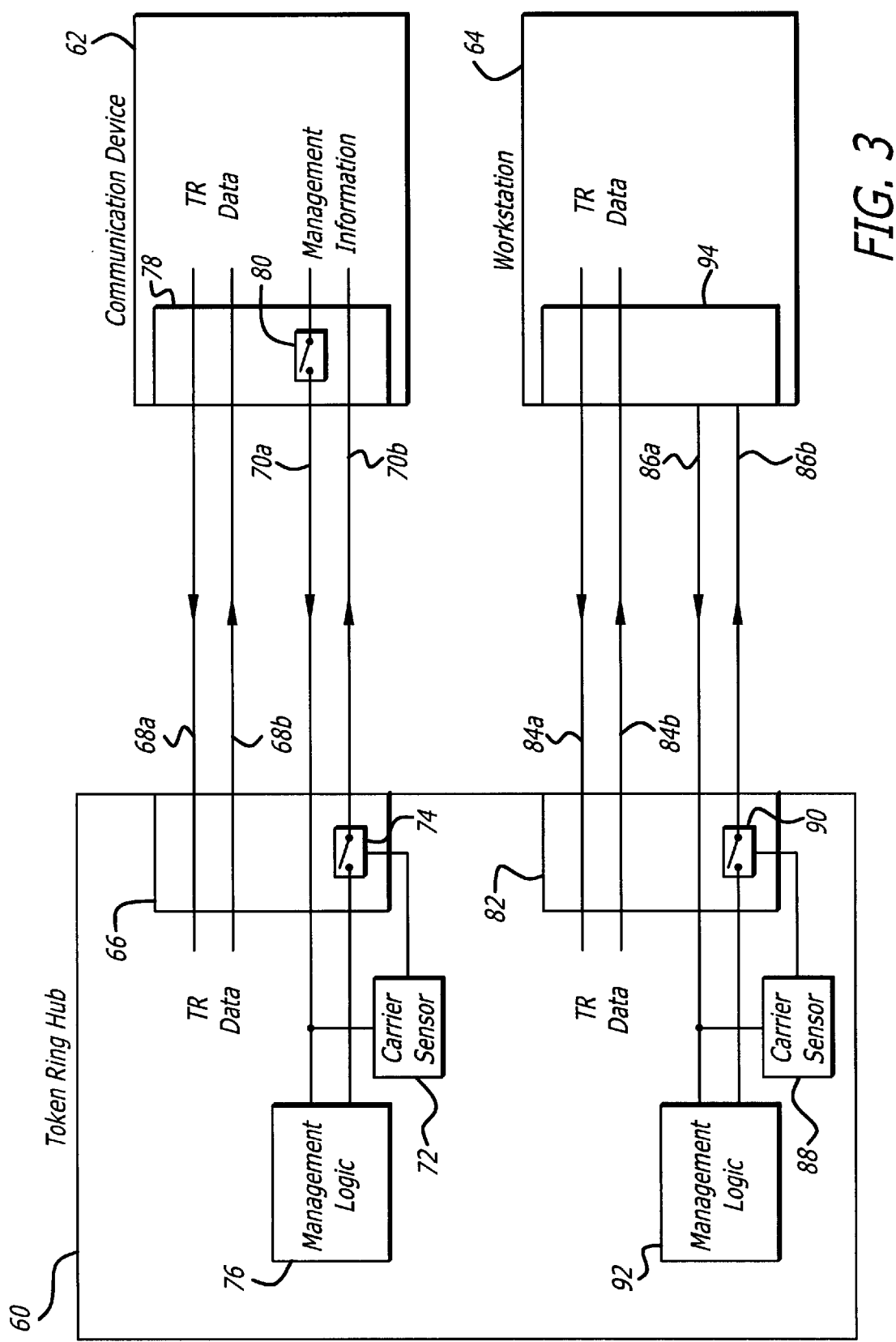
FIG. 3 illustrates an embodiment of a Token Ring hub coupled to multiple Token Ring devices.

FIG. 3 illustrates an embodiment of a Token Ring hub 60 coupled to multiple Token Ring devices 62 and 64. Token Ring hub 60 includes two dual-mode ports 66 and 82 coupled to communication device 62 and workstation 64, respectively. Dual-mode port 66 is coupled to four conductors 68a, 68b, 70a, and 70b. In an embodiment of the invention, conductors 68a, 68b, 70a, and 70b are grouped together in a single cable. Conductors 68a and 68b are used to transmit Token Ring data (labeled "TR Data") between Token Ring hub 60 and communication device 62. Conductors 70a and 70b are used to transmit management information between Token Ring hub 60 and communication device 62. As discussed above, an embodiment of the invention uses the Ethernet protocol to transmit management information between Token Ring hub 60 and communication device 62.

In an alternative embodiment of the invention, each conductor 68a–68d in FIG. 3 is replaced with a twisted pair of conductors, resulting in a total of eight conductors. All four twisted pairs may be included in a single cable.

Token Ring hub 60 includes a carrier sensor 72 coupled to conductor 70a and a switch 74. Carrier sensor 72 determines whether a carrier (e.g., a link test pulse in an Ethernet-based system) is present on conductor 70a, which communicates management information. The carrier signal type will vary with the protocol used to communicate across conductors 70a and 70b. This carrier is part of the management information and is separate from any carrier transmitted on a conductor which communicates data. If a carrier is detected, then carrier sensor 72 closes switch 74 to permit communication of management information on conductors 70a and 70b. If a carrier is not detected within a particular time period, then carrier sensor 72 opens switch 74 to prevent transmission of management information across conductor 70b. This detection of a carrier on conductor 70a is performed automatically by carrier sensor 74, thereby providing automatic configuration of dual-mode port 66. Switch 72 can be implemented using one or more logic gates, a relay, a transistor, or other switching device.

If communication device 62 includes a dual-mode port (as shown in FIG. 3) capable of communicating management information across conductors 70a and 70b, then carrier sensor 72 will detect the presence of a carrier on conductor 70a and configure port 66 as a dual-mode port. In this situation, a management logic module 76 controls the flow of management information between Token Ring hub 60 and communication device 62. If communication device 62 does not contain a dual-mode port, or if the port is configured to transmit data only, then carrier sensor 72 will not detect a carrier on conductor 70 and will configure port 66 as a data-only port. Thus, various types of devices having different types of ports can be coupled to port 66 without requiring any manual configuration of port 66.

Communication device 62 includes a dual-mode port 78 capable of operating as a data-only port or a dual-mode port for transmitting data as well as management information. The mode of operation of port 78 is determined by a switch 80. In a particular embodiment of the invention, switch 80 is a manual switch that is set by a user of device 62 or a system administrator, indicating the mode in which port 78 will operate. Alternatively, switch 80 may be any type of manual, automatic, or software-controlled switch. If switch 80 is open, then port 78 operates as a fixed-mode port because there is a physical break in the connection to conductor 70a such that no carrier will be transmitted to Token Ring hub 60. Alternatively, port 78 may operate as a fixed-mode port if the carrier on conductor 70a is suppressed. If switch 80 is closed, then port 78 operates as a dual-mode port, thereby permitting the simultaneous exchange of Token Ring data and management information between Token Ring hub 60 and communication device 62.

Token Ring hub 60 also includes an additional dual-mode port 82 similar to port 66 discussed above. Dual-mode port 82 communicates Token Ring data with workstation 64 using a pair of conductors 84a and 84b. Dual-mode port 82 is also coupled to conductors 86a and 86b, which are used to communicate management information between Token Ring hub 60 and workstation 64. In one embodiment of the invention, conductors 84a, 84b, 86a, and 86b are grouped together in a single twisted-pair cable.

A carrier sensor 88 in Token Ring hub 60 is coupled to conductor 86a and a switch 90. As discussed above with reference to carrier sensor 72, if a carrier is detected on conductor 86a, carrier sensor 88 closes switch 90 to permit the communication of management information across conductors 86a and 86b. Otherwise, carrier sensor 88 opens switch 90 to prevent the transmission of management information across conductor 86b. A management logic module 92 controls the flow of management information between Token Ring hub 60 and workstation 64.

In the example shown in FIG. 3, workstation 64 contains a fixed-mode port 94 that is not capable of receiving management information from Token Ring hub 60. In this example, workstation 64 will not transmit a carrier across conductor 86a. Therefore, carrier sensor 88 will open switch 90 to prevent the transmission of management information across conductor 86b. Preventing the unnecessary transmission of management information across conductor 86b reduces electromagnetic interference.

Thus, as shown in FIG. 3, dual mode ports 66 and 82 are automatically configured to communicate with the device coupled to the port. If the device coupled to the port (e.g., communication device 62) is capable of communicating management information, then the port is configured to support this mode of operation. However, if the device coupled to the port (e.g., workstation 64) is not capable of communicating management information, then the port is configured to support a dataonly mode of operation. This automatic configuration permits a single port to be coupled to various types of devices and ports without requiring a manual configuration of the port or requiring that each port have a dedicated mode of operation.

Figure 4:
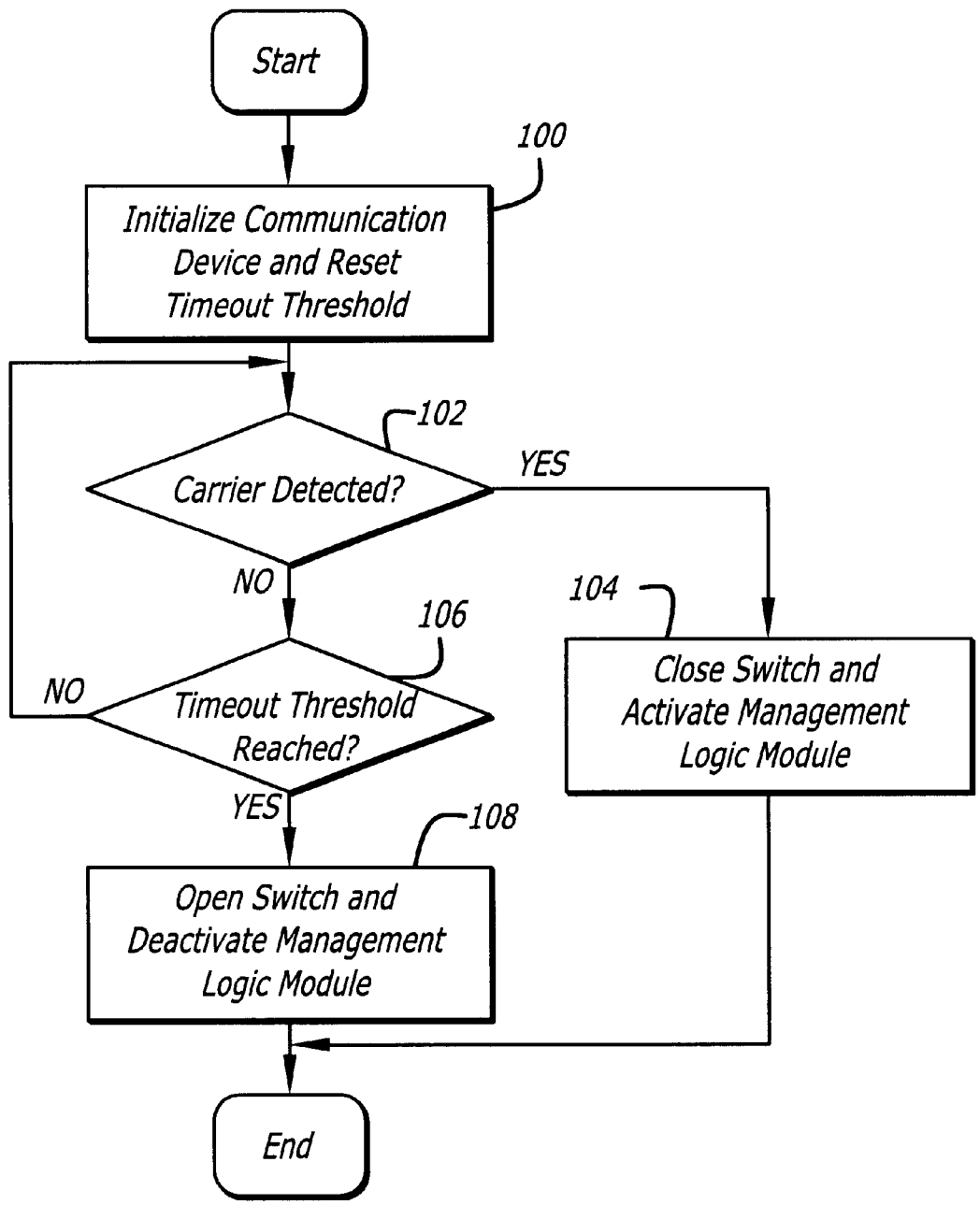
FIG. 4 is a flow diagram illustrating an embodiment of a procedure for configuring a dual-mode port.

FIG. 4 is a flow diagram illustrating an embodiment of a procedure for configuring a dual-mode port, such as port 66 or 82 in FIG. 3. At block 100, the communication device is initialized and a timeout threshold is reset. The timeout threshold, as discussed below, identifies the length of time that the dual-mode port will search for a carrier (indicating that the port on the opposite end of the communication link is capable of communicating management information). At block 102, the procedure determines whether a carrier has been detected (e.g., on conductor 70a or 86a in FIG. 3). If a carrier is detected, then block 104 closes the switch in the dual-mode port and activates the management logic module. At this point, the dual-mode port is configured to communicate data (e.g., Token Ring data) as well as management information across the communication link.

If a carrier has not been detected at block 102, then the procedure continues to block 106 to determine whether the timeout threshold has been reached. The timeout threshold identifies the length of time that the dual-mode port will search for a carrier. If the threshold has not been reached in block 106, the procedure returns to step 102 to continue searching for a carrier. If the timeout threshold is reached or exceeded at block 106, then the procedure continues to step 108 where the switch in the dual-mode port is opened and the management logic module is deactivated.

The procedure illustrated in FIG. 4 can be executed periodically to check the status of the port at the opposite end of a communication link. Thus, if a device is disconnected from the communication link, or a different device is connected to the communication link, the procedure of FIG. 4 identifies this change and modifies the switch setting in the dual-mode port, if necessary. In a particular embodiment of the invention, the procedure of FIG. 4 is executed approximately once each second for each dual mode port in the communication device.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method comprising:
    coupling a first communication link and a second communication link to a first port of a first device; and
    configuring the first port to transfer data over the first communication link and management information over the second communication link in response to a carrier signal being detected on the second communication link.

2. The method of claim 1, wherein the first communication link and the second communication link are included in one communication cable.

3. The method of claim 1, wherein the management information includes commands to control operations of a second device coupled to the second communication link.

4. The method of claim 1, wherein the management information includes information to monitor a second device coupled to the second communication link.

5. The method of claim 1, wherein configuring the first port includes configuring the first port to transfer data in accordance with a first protocol and to transfer the management information in accordance with a second protocol.

6. The method of claim 5, wherein the transfer of the data and the transfer of the management information are generally concurrent to each other.

7. The method of claim 5, wherein the first protocol is Token Ring.

8. The method of claim 7, wherein the second protocol is Ethernet.

9. The method of claim 1 further comprising:
    configuring the first port to only transfer data over the first communication link if the carrier signal is not detected on the second communication link.

10. A communication device comprising:
    port means for transferring information between said communication device and another device; and
    configuration means for configuring the port means to transfer both data and management information, if it is determined that said another device is capable of communicating management information.

11. The communication device of claim 10 further comprising means for coupling the port means to said another device, the means for coupling includes at least one communication cable having a first communication link and a second communication link.

12. The communication device of claim 11, wherein the at least one communication cable is a twisted-pair cable including the first communication link having a first pair of conductors and the second communication link having a second pair of conductors.

13. The communication device of claim 11, wherein the configuration means for configuring the port includes:
    sensing means for automatically detecting whether a carrier signal is present on the second communication link, the carrier signal indicating that said another device is capable of communicating management information; and
    switching means for configuring the port means to transfer both the data and management information in response to the carrier signal being detected.

14. The communication device of claim 10, wherein the management information includes commands to control operations of said another device.

15. The communication device of claim 10, wherein the management information includes information to monitor said another device.

16. A communication device comprising:
    a port to communicate data over a first communication link and management information over a second communication link;
    a carrier sensor coupled to the port, the carrier sensor to detect a carrier signal provided through the port; and
    a switch coupled to the port and the carrier sensor, the switch to permit communication of both the data and the management information when the carrier signal is detected.

17. The communication device of claim 16, wherein the switch also prohibits communication of the management information when the carrier signal is not detected.

18. The communication device of claim 16 wherein the port communicates data according to a first protocol and management information according to a second protocol.

19. The communication device of claim 18, wherein the first communication link and the second communication link are included in a single cable having a plurality of conductors.

20. The communication device of claim 18, wherein the first communication link and the second communication link are included in a twisted-pair cable having a plurality of pairs of conductors.

21. The communication device of claim 20, wherein the port communicates the data in accordance with the first protocol across a first pair of conductors and the port communicates the management information in accordance with the second protocol across a second pair of conductors.

22. The communication device of claim 16 being a switching system product.

23. The communication device of claim 16 being a transmission system product.

* * * * *